(12) United States Patent
Karrasch et al.

(10) Patent No.: US 12,234,036 B2
(45) Date of Patent: Feb. 25, 2025

(54) VACUUM FILM WITH VENTILATION

(71) Applicant: AIRBUS OPERATIONS GMBH, Hamburg (DE)

(72) Inventors: Tobias Karrasch, Dortmund (DE); Roman Kleinpeter, Stade (DE)

(73) Assignee: Airbus Operations GmbH, Hamburg (DE)

( * ) Notice: Subject to any disclaimer, the term of this patent is extended or adjusted under 35 U.S.C. 154(b) by 788 days.

(21) Appl. No.: 16/145,587

(22) Filed: Sep. 28, 2018

(65) Prior Publication Data

US 2019/0106225 A1   Apr. 11, 2019

(30) Foreign Application Priority Data

Sep. 28, 2017 (DE) ..................... 10 2017 122 630.3

(51) Int. Cl.
| | | |
|---|---|---|
| *B64F 5/40* | (2017.01) | |
| *B29C 59/02* | (2006.01) | |
| *B29C 59/04* | (2006.01) | |
| *B29C 73/10* | (2006.01) | |
| *B29C 73/30* | (2006.01) | |
| *B29K 79/00* | (2006.01) | |
| *B29K 505/00* | (2006.01) | |
| *B29K 507/04* | (2006.01) | |
| *B29L 31/30* | (2006.01) | |

(52) U.S. Cl.
CPC ............... *B64F 5/40* (2017.01); *B29C 59/026* (2013.01); *B29C 59/04* (2013.01); *B29C 73/10* (2013.01); *B29C 73/30* (2013.01); *B29K 2079/08* (2013.01); *B29K 2505/00* (2013.01); *B29K 2507/04* (2013.01); *B29K 2995/0005* (2013.01); *B29L 2031/3076* (2013.01)

(58) Field of Classification Search
CPC ........ B29K 2995/0005; B29K 2079/08; B29K 2505/00; B64F 5/40
See application file for complete search history.

(56) References Cited

U.S. PATENT DOCUMENTS

| | | | | |
|---|---|---|---|---|
| 4,912,594 A | * | 3/1990 | Bannink, Jr. ............. | H05F 3/00 244/1 A |
| 5,129,813 A | * | 7/1992 | Shepherd ............ | B32B 37/1018 156/286 |
| 5,215,824 A | * | 6/1993 | Munro, III .............. | B32B 27/28 428/473.5 |
| 5,837,185 A | | 11/1998 | Livesay et al. | |

(Continued)

FOREIGN PATENT DOCUMENTS

| | | |
|---|---|---|
| DE | 20 2010 012086 U1 | 12/2010 |
| DE | 10 2011 076 463 A1 | 11/2012 |

(Continued)

OTHER PUBLICATIONS

European Search Report for Application No. 18197241.5 dated Feb. 25, 2019.

(Continued)

*Primary Examiner* — Maria V Ewald
*Assistant Examiner* — Daniel P Dillon
(74) *Attorney, Agent, or Firm* — KDW Firm PLLC

(57) ABSTRACT

Film for the repair of aircraft components made of fiber-reinforced thermoplastic including an embossed film made of polyimide and a coating made of an electrically conductive material.

19 Claims, 1 Drawing Sheet

(56) References Cited

U.S. PATENT DOCUMENTS

| | | | |
|---|---|---|---|
| 8,545,650 B2 * | 10/2013 | Evens | G01N 27/00 |
| | | | 156/64 |
| 2002/0106522 A1 * | 8/2002 | McCormack | H05K 3/205 |
| | | | 216/67 |
| 2010/0108255 A1 | 5/2010 | Micarelli | |
| 2016/0082710 A1 * | 3/2016 | Coxon | B30B 5/02 |
| | | | 156/60 |
| 2016/0177062 A1 * | 6/2016 | Sato | C08K 3/346 |
| | | | 524/127 |
| 2018/0361690 A1 * | 12/2018 | Huang | B29C 73/30 |

FOREIGN PATENT DOCUMENTS

| | | |
|---|---|---|
| DE | 10 2013 212 420 A1 | 12/2014 |
| EP | 422919 A2 * | 4/1991 |
| EP | 2 796 265 A1 | 10/2014 |

OTHER PUBLICATIONS

German Search Report for German Application No. 10 2017 122 630.3 dated Mar. 29, 2018.

* cited by examiner

VACUUM FILM WITH VENTILATION

CROSS-REFERENCE TO RELATED APPLICATION

This application claims priority to German patent application DE 10 2017 122 630.3 filed Sep. 28, 2017, the entire disclosure of which is incorporated by reference herein.

TECHNICAL FIELD

The disclosure herein relates to an aid to the repair of components made of fiber-composite materials such as GRP (glass-fiber-reinforced plastic) or CRP (carbon-fiber-reinforced plastic), in particular in aircraft construction and in aircraft repair.

BACKGROUND

Fiber-composite materials can comprise a reinforcement material (fibers) and a matrix. The matrix sheaths and fixes the fibers. The fibers can consist of aramid, carbon, glass or wood. Glass fibers and carbon fibers are especially used in aircraft construction. Reactive resins, known as thermosets, are important as matrix. These can be polyester resins or epoxy resins. The matrix can also consist of thermoplastics, for example polyetheretherketone (PEEK). Thermoplastics are not reactive, but can be liquefied by melting and can thus sheath fibers. Fiber-composite materials mostly have a layer-type structure in which the fibers run in various directions in a plurality of layers.

Nowadays, aircraft are to some extent or substantially manufactured from fiber-composite components. Carbon-fiber-reinforced plastic has a long history of use in control surfaces of Airbus aircraft. Many modern gliders consist mostly of glass-fiber-reinforced plastic. Current aircraft models moreover have fuselage and/or wings made of, or substantially consisting of, carbon-fiber-reinforced plastic.

During operation of aircraft, damage due to airborne stones, ice, birds or projectiles is unavoidable. If the surface of an aircraft at the damaged location consists of metal, repair can be carried out relatively easily: the damaged area is removed and a replacement section made of the same material and of the same size is inserted. The section is bonded to the adjoining material by riveting.

This type of procedure is mostly not possible in the case of fiber-reinforced plastics materials, because the material consists of many fiber plies, and its stability is derived from the bonding of these individual plies to one another. It is therefore necessary to treat the damaged location in a manner such that the repair plies directly adjoin the intact plies present and respectively are partially covered by further plies. This is achieved by using unhardened prepreg material or unhardened thermoplastic material. The expression unhardened material means material in which matrix material sheaths the fibers and is initially liquid or semiliquid, or can be converted into that state, and solidifies subsequently as a result of curing or cooling.

During the repair of fiber-composite materials, therefore, new, unhardened, or hardenable, fiber plies are introduced. In order to maximize fiber content after hardening, the hardening takes place under pressure.

Heated presses are usually used in order to generate the required pressure. These are very rarely suitable for aircraft repair. Another widely used possibility is provided by what are known as vacuum add-ons. Here, the materials to be hardened are enclosed into a film, subjected to vacuum, and hardened. The fiber plies to be hardened here are compressed by atmospheric pressure and heated and consolidated via introduction of heat. A peel fabric is often used to absorb excess matrix material; this absorbs excess resin and can easily be removed after hardening. In order that the prevailing pressure within the vacuum system is substantially identical throughout, materials known as ventilation fabrics are used. These allow substantially free movement of air or gas within the vacuum system.

Hardening of the material is achieved by temperature increase and introduction of heat. Heating blankets, hot-air tents, or hot-air boxes are used for this purpose. The positioning and cutting-to-size of the aids used—vacuum film, peel fabric and ventilation fabric—is difficult and time-consuming. In the case of thermoplastically impregnated fiber-composite materials that have recently come into use, it is sometimes necessary to operate with high temperatures of up to 400° C.

SUMMARY

It is an object of the disclosure herein to provide aids that are suitable for the repair of fiber-composite materials impregnated with thermoplastic matrix material, and that provide easier and quicker repairs.

In a complete surprise to the person skilled in the art, it has now been found that a film for the repair of aircraft components made of fiber-reinforced thermoplastic comprising an embossed film made of polyimide and a coating made of an electrically conductive material overcomes the disadvantages of the prior art. With this film, a vacuum system which also withstands high temperatures can be provided very easily and rapidly. It is preferable that the resistivity and layer thickness of the electrically conductive material allow use of electric current to heat the film. It is thus possible to omit hot-air tents, autoclaves, etc., and this is extremely advantageous because such apparatuses cannot readily be operated in the required temperature range of up to 400° C. These films of the disclosure herein are also suitable for epoxy-resin-impregnated prepregs. It is preferable here that the electrically conductive material Is metal powder or graphite powder. This has advantageously been bound in a binder. It is preferable that the embossed film consists essentially of Kapton. It is preferable that the thickness of the film is from 50 to 100 micrometers. It is preferable that the depth of the embossment of the film is from 0.01 to 0.5 mm. The embossment permits development of a pressure difference by evacuation of gases over a large area from the (repair) vacuum system. The embossment replaces use of a ventilation fabric. Possible embossment geometries are by way of example cones, truncated cones, pyramids, truncated pyramids, and also hemispherical embossments. It is preferable that the film comprises a further layer made of a material with release properties. To this end, the embossed film can be surface-modified by plasma in a manner that avoids any bonding to the substrate. The coating leaves no residues on the substrate. The coating permits removal of the vacuum film with no possibility of any adverse effect on the substrate. The release layer applied replaces a conventional release film. It is preferable that the film can be produced by a process comprising: providing the film made of polyimide, printing the film with a coating comprising electrically conductive material, and embossing the coated film with an embossing roll. It is possible to begin by embossing the film and then to print same, or to begin by printing the film and then to emboss same. The effect of all of the above is that release film, vacuum film and heating element are combined in one material. By virtue of the print applied, very precise introduction of heat into the repair area is possible; equally, variable layer thickness of the printed material can be used to adjust the introduction of heat to the circumstances in a controlled manner. The printed material replaces a conventional heating mat, which in this case would not achieve the temperature of up to 400° C. used for repairs involving thermoplastics.

BRIEF DESCRIPTION OF THE DRAWINGS

The aspects described above, and further aspects, features and advantages of the disclosure herein can likewise be found in the examples of the embodiments which are described below with reference to the attached drawings.

The figures use identical reference signs for elements, components or aspects that are identical or at least similar. It should be noted that the embodiments described in detail below are merely illustrative and are not restrictive.

DETAILED DESCRIPTION

Figure 1:
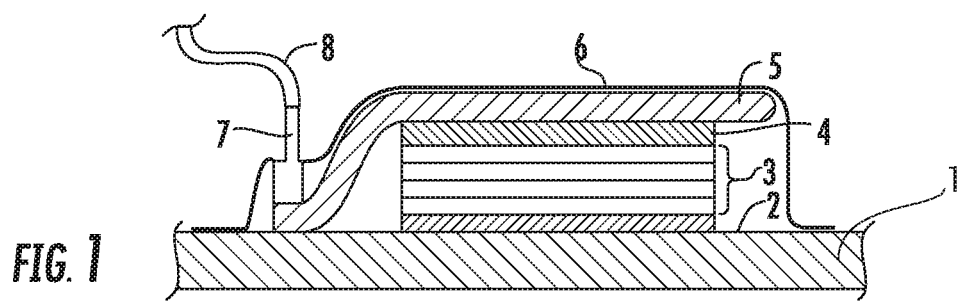
FIG. 1 shows a conventional vacuum system.

FIG. 1 shows a conventional vacuum system.

A release film (2) is placed onto, or a release means (2) is applied to, a mold or an intact and undamaged component area (1). Suitable prepreg plies (1) can be placed thereon. Peel fabric, with a release film (4) lying on its upper side, can then be placed thereon, and onto this a ventilation fabric (5) is placed. Finally, a vacuum film (6) is applied into which a fitting (7) connected to a hose (8) has been introduced. Air can be sucked out of the system by applying vacuum through the hose (8). The ventilation fabric (6) allows substantially uniform pressure distribution within the vacuum system. Heat is introduced in order to harden the prepreg material (3). This can be achieved via an autoclave, a heating mat, a hot-air box or a hot-air tent. During hardening of the prepreg material (3), excess matrix material passes into the peel fabric (4). After ventilation, the film (6), the ventilation material (5) and the peel fabric, with the release film (7) lying on the upper side thereof, can be removed and sent for disposal, together with hardened matrix material comprised therein.

Figure 2:
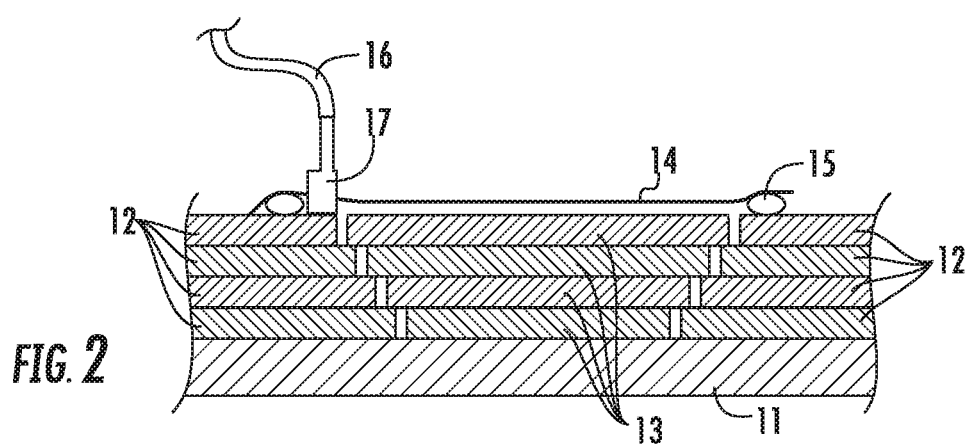
FIG. 2 shows a novel vacuum system with a vacuum film of the disclosure herein.

FIG. 2 shows a novel vacuum system with a vacuum film of the disclosure herein.

Unhardened prepreg plies (13) are placed onto intact CRP plies (11) in a manner such that they abut intact material (12). The film (14) of the disclosure herein is placed thereon and sealed by a sealant (15) around the entire periphery to the intact component (11), (12). Vacuum is applied by way of the hose (16) and the fitting (17). Hardening is achieved with the use of an autoclave, a heating mat, a hot-air box or a hot-air tent. After hardening of the component or of the repair location (13), the film (14) of the disclosure herein can be removed. No waste materials arise other than the film (14) and the sealant (15).

Figure 3:
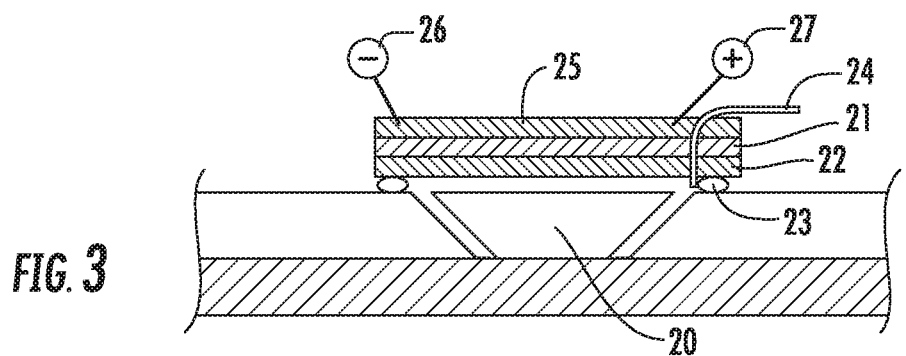
FIG. 3 shows another embodiment of the vacuum film of the disclosure herein.

FIG. 3 shows another embodiment of the vacuum film of the disclosure herein.

The repair location (20) to be hardened comprises unhardened prepreg material or thermoplastically reinforced material made of carbon fibers, and is covered by the vacuum film (21), which comprises a coating (22) with release properties. This can be a plasma coating. A sealant (23) seals the film (21) to the intact component. The sealant (23) can be a strip of putty. A fitting and a hose (24) allow application of vacuum. An externally situated electrically conductive coating (25) allows application of electrical current by way of electrical connections (26) and (27), and thus generation and transfer of heat to the repair location (20) (resistance heating). The coating (25) can consist of metal or of carbon nanotubes.

Figure 4:
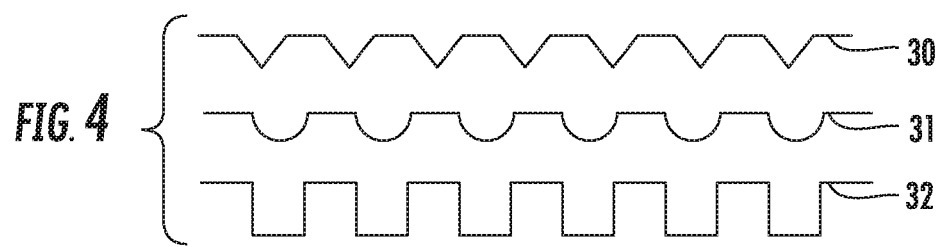
FIG. 4 shows possible embossments of a vacuum film of the disclosure herein.

FIG. 4 shows possible embossments of a vacuum film of the disclosure herein.

The embossments (30) of the film can be conical or pyramidal. Other inventive embossments of the film (31) can take the form of small depressions or of conical sections, similar to those in a golf ball.

Other embossments (32) likewise of the disclosure herein can be cube- or block-shaped.

Although the disclosure herein has been illustrated and described in detail in the drawings and the description above, those illustrations and descriptions are intended merely to be illustrations or examples, and not to be restrictive, and the disclosure herein is therefore not restricted by the embodiments disclosed. The words "having" and "comprising" in the claims do not exclude other elements, and the indefinite article "a/an" does not exclude a plurality.

Mention of particular features in different dependent claims does not in itself restrict the subject matter of the disclosure herein. Combinations of these features can also be used advantageously. The reference signs in the claims are not intended to restrict the scope of the claims.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Intact component area
2 Release film
3 Prepreg plies
4 Peel fabric and release film
5 Ventilation fabric
6 Vacuum film
7 Fitting
8 Vacuum hose
11 Underlying intact CRP plies
12 Intact CRP plies adjacent in same plane
13 Unhardened prepreg plies or repair location
14 Film
15 Sealant
16 Vacuum hose
17 Fitting
20 Repair location to be hardened
21 Vacuum film 22 Coating with release properties
23 Sealant
24 Fitting with hose
25 Electrically conductive coating
26, 27 Electrical connections
30 Film with conical or pyramidal embossments
31 Film with embossments in the form of small depressions
32 Film with cubic or block-shaped embossments

The invention claimed is:

1. A film for repair of aircraft components made of fiber-reinforced thermoplastic, the film comprising:
    a coating formed as an exterior surface of the film, wherein the coating is made of an electrically conductive material;
    wherein the film is an embossed film that consists essentially of Kapton.

2. The film according to claim 1, wherein resistivity and layer thickness of the electrically conductive material allow use of electric current to heat the film.

3. The film according to claim 1, wherein the electrically conductive material is metal powder or graphite powder.

4. The film according to claim 1, wherein a thickness of the film is from 50 to 100 micrometers.

5. The film according to claim 1, wherein a depth of an embossment of the embossed film is from 0.01 to 0.5 mm.

6. The film according to claim 1, comprising a further layer made of a material with release properties.

7. A process for producing a film, which consists essentially of Kapton, for repair of aircraft components made of fiber-reinforced thermoplastic, the method comprising:
    printing the film with a coating comprising electrically conductive material, wherein the coating is disposed over the film to form an exterior surface of the film; and
    embossing the film with an embossing roll.

8. The film according to claim 6, wherein the further layer is a plasma coating.

9. The film according to claim 6, wherein the further layer is on an opposite side of the film from the coating made of the electrically conductive material.

10. The film according to claim 9, wherein the further layer is a plasma coating.

11. A vacuum system for repair of an aircraft component made of fiber-reinforced thermoplastic, the vacuum system comprising:
    a vacuum film comprising:
        a coating formed as an exterior surface of the film, wherein the coating is made of an electrically conductive material;
        wherein the vacuum film is an embossed film that consists essentially of Kapton;
    a sealant provided about an entire periphery of a damaged portion of the aircraft component to seal the vacuum film over the damaged portion; and
    a vacuum hose connected to the vacuum film and configured to apply a vacuum within the damaged portion of the aircraft component to press the vacuum film against prepreg plies arranged within the damaged portion.

12. The vacuum system according to claim 11, wherein resistivity and layer thickness of the electrically conductive material allow use of electric current to heat the film.

13. The vacuum system according to claim 11, wherein the electrically conductive material is metal powder or graphite powder.

14. The vacuum system according to claim 11, wherein a thickness of the film is from 50 to 100 micrometers.

15. The film according to claim 1, wherein a depth of an embossment of the embossed film is from 0.01 to 0.5 mm.

16. The vacuum system according to claim 11, comprising a further layer made of a material with release properties.

17. The vacuum system according to claim 16, wherein the further layer is a plasma coating.

18. The vacuum system according to claim 16, wherein the further layer is on an opposite side of the film from the coating made of the electrically conductive material.

19. The vacuum system according to claim 18, wherein the further layer is a plasma coating.

* * * * *

UNITED STATES PATENT AND TRADEMARK OFFICE
CERTIFICATE OF CORRECTION

PATENT NO. : 12,234,036 B2  
APPLICATION NO. : 16/145587  
DATED : February 25, 2025  
INVENTOR(S) : Tobias Karrasch and Roman Kleinpeter Page 1 of 1

It is certified that error appears in the above-identified patent and that said Letters Patent is hereby corrected as shown below:

In the Claims

Column 6 Line 28, Claim 15: "The film according to claim 1, wherein a depth of an" should be -- The vacuum system according to claim 11, wherein a depth of an --.

Signed and Sealed this  
Sixteenth Day of September, 2025

Coke Morgan Stewart  
*Acting Director of the United States Patent and Trademark Office*